(12) United States Patent  (10) Patent No.: US 6,394,399 B2
Koziol  (45) Date of Patent: May 28, 2002

(54) CABLE HOLDER FOR ATTACHING CABLES TO A SUPPORT STRUCTURE

(75) Inventor: Siegmund Koziol, Hohenlinden (DE)

(73) Assignee: Eads Deutschland GmbH, Munich (DE)

(*) Notice: Subject to any disclaimer, the term of this patent is extended or adjusted under 35 U.S.C. 154(b) by 0 days.

(21) Appl. No.: 09/800,135

(22) Filed: Mar. 5, 2001

(30) Foreign Application Priority Data

Mar. 6, 2000 (DE) .......................................... 100 10 933

(51) Int. Cl.⁷ .................................................. F16L 3/08
(52) U.S. Cl. ........................ 248/74.3; 248/68.1; 248/69
(58) Field of Search ........................... 248/69, 72, 74.3, 248/68.1

(56) References Cited

U.S. PATENT DOCUMENTS

| | | | | |
|---|---|---|---|---|
| 1,462,671 A | * | 7/1923 | Vrba | 248/71 |
| 2,342,958 A | * | 2/1944 | Morehouse | 248/68 |
| 2,427,770 A | * | 9/1947 | Ellinwood | 248/74 |
| 2,431,379 A | * | 11/1947 | Ellinwood | 248/74 |
| 3,632,069 A | | 1/1972 | Thayer | 248/56 |
| 4,379,537 A | * | 4/1983 | Perrault et al. | 248/74 R |
| 4,397,436 A | * | 8/1983 | Lyon et al. | 248/68 R |
| 5,332,179 A | * | 7/1994 | Kuffel et al. | 248/74.3 |
| 5,390,883 A | * | 2/1995 | Songhurst | 248/74.3 |

FOREIGN PATENT DOCUMENTS

| | | |
|---|---|---|
| DE | 675892 | 5/1939 |
| DE | 1886744 | 1/1964 |
| DE | 1896156 | 7/1964 |
| DE | 1989458 | 7/1968 |
| DE | 3013750 | 10/1981 |
| DE | 9005666 | 9/1990 |
| DE | 9317299 | 3/1994 |
| EP | 0718946 | 6/1996 |
| JP | 10220649 | 8/1998 |

OTHER PUBLICATIONS

Patent Abstracts of Japan of JP10220649 Dated Aug. 21, 1998.

* cited by examiner

Primary Examiner—Leslie A. Braun
Assistant Examiner—Kofi Schulterbrandt
(74) Attorney, Agent, or Firm—Ladas & Parry

(57) ABSTRACT

A cable holder for attaching cables to a support structure, wherein the cable holder has a mounting bracket attachable to a support structure and a cable supporting portion extending at an angle from the mounting bracket at an edge thereof. The cable supporting portion has a bottom portion for supporting the cables, and two end portions extending upwardly from the bottom portion, and having openings through which a cable connector can pass for securing the cables to the holder. Two cylindrical pins are provided on the mounting bracket in proximity to the end portions and face in a direction away from the cable supporting portion. The mounting bracket has a mounting hole for a fastener at a distance from the pins, the cable holder is secured to the support structure by the fastener while the pins engage a support edge of the support structure to prevent rotation of the cable holder around the fastener.

9 Claims, 2 Drawing Sheets

CABLE HOLDER FOR ATTACHING CABLES TO A SUPPORT STRUCTURE

FIELD OF THE INVENTION

The invention relates to a cable holder for attaching cables to a support structure and particularly to a vehicle structure.

BACKGROUND AND PRIOR ART

It is known to provide cable holders on vehicle structures by integrating the cable holder with the vehicle structure usually as an integrated member. The cable holders can employ connectors for the cable in the form of eye and hook elements. A disadvantage of these cable holders is that they are made as part of the support structure and thereby involve great complexity in the production of the support structure.

DE-GM 1989458 discloses a cable holder for attaching cables to a support structure by means of cable connectors such as straps in which the cable holder has a fastening bracket and a cradle-shaped portion integrally formed with the bracket for receiving the cables in a slot in the cradle-shaped portion.

DE-GM 1886744 shows a cable holder with a cradle-shaped support having two branches each provided with a slot for passage therethrough of the cable strap.

SUMMARY OF THE INVENTION

An object of the invention is to provide a cable holder for attachment of cables to a vehicle structure in which the cable holder can be mounted with extreme simplicity even in difficult to reach places and can be attached with high stability with simple means.

In accordance with the invention the cable holder comprises a mounting bracket which is attachable to a support structure and a cable supporting portion extending at an angle from the mounting bracket and integrally formed therewith at an edge of the mounting bracket. The cable supporting portion includes a bottom portion for receiving the cables and two end portions extending upwardly from the bottom portion, the end portions having openings through which a cable connector can pass for securing the cables to the holder. Two cylindrical pins are provided on the mounting bracket in proximity to the end portions of the cable supporting portion and the pins face in a direction away from the cable supporting portion. The mounting bracket has a mounting hole for a fastener at a distance from the pins and the cable holder is secured to the support structure by the fastener while the pins engage a support edge of the support structure to prevent rotation of the cable holder around the fastener.

According to a feature of the invention, the mounting bracket and cable supporting portion is formed as a one-piece body made of polyether ether ketone.

According to a further feature of the invention, the openings in the end portions of the cable supporting portion are formed as rectangular slots.

According to a another feature of the invention, the cable supporting portion has a back flange which forms a cradle recess for the cable connector.

DETAILED DESCRIPTION

Figure 1:
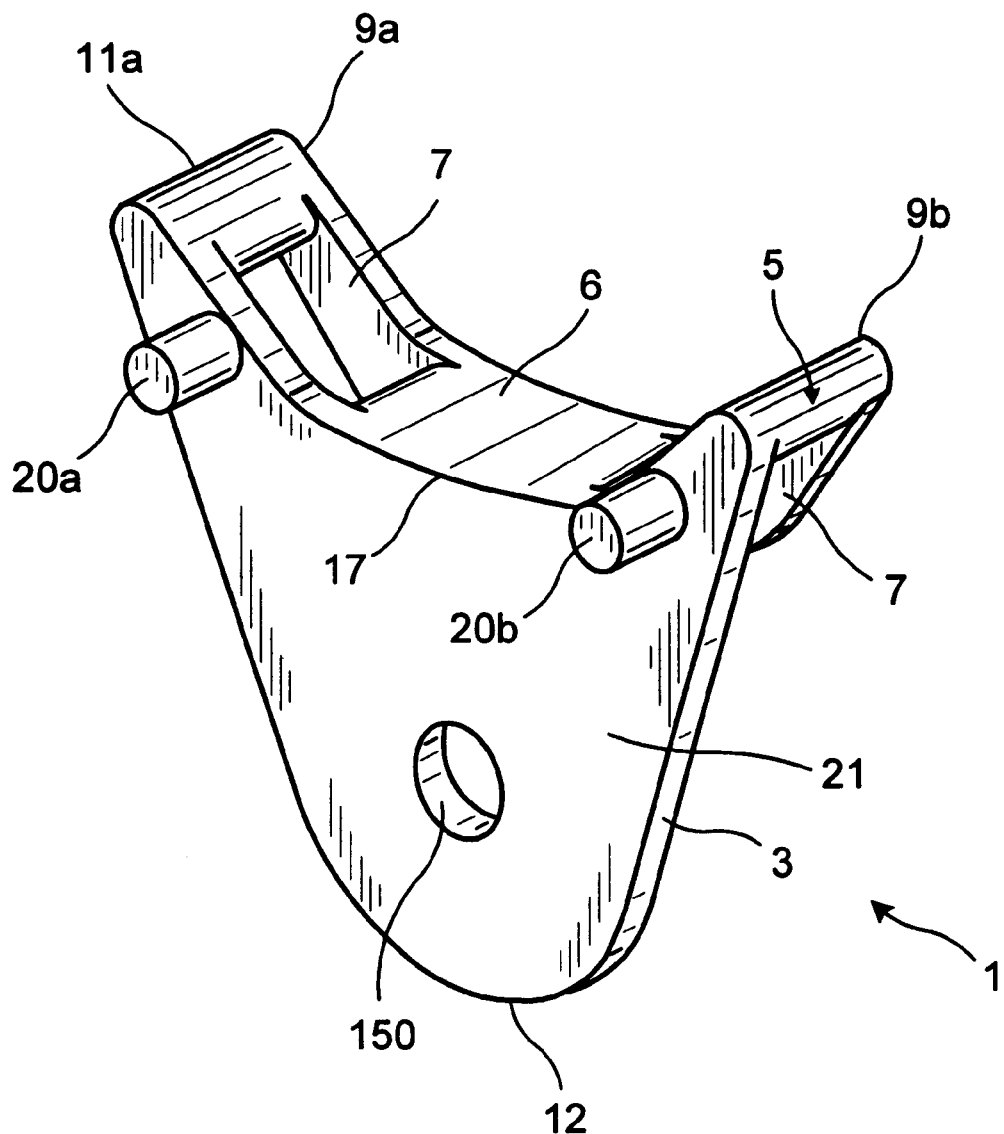
FIG. 1 is a front perspective view showing the cable holder of the present invention in which the cables have been omitted.
Figure 2:
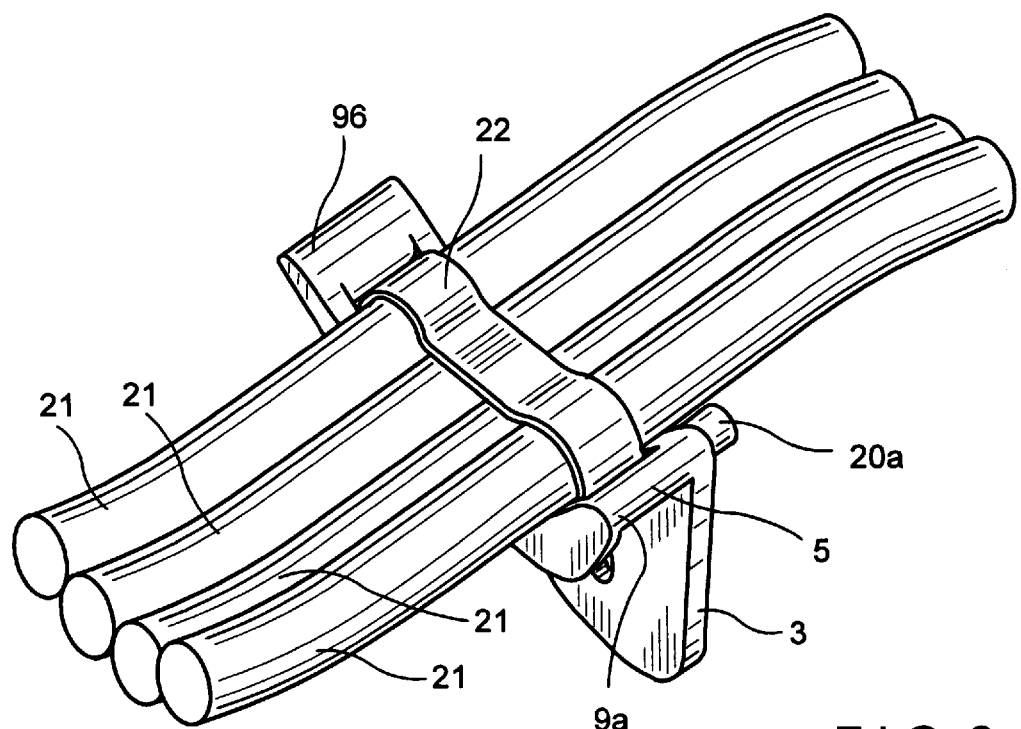
FIG. 2 is a top perspective view showing the cable holder with the cables secured thereto.
Figure 3:
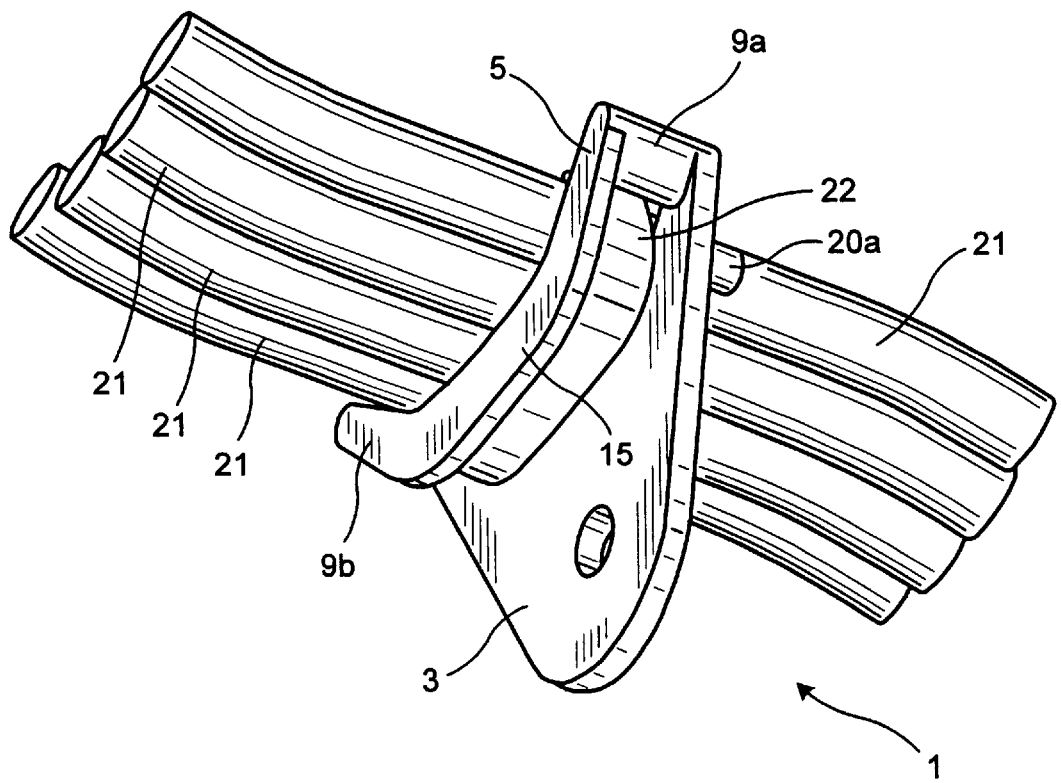
FIG. 3 is a bottom perspective view of the cable holder with the cables secured thereto.

Referring to the drawing, therein is shown a cable holder 1 constructed as a molded, one-piece body which includes a mounting bracket 3 attachable to a support structure and a cable supporting portion 5 extending at a right angle from the mounting bracket at an upper edge 17 thereof. The cable supporting portion 5 has a bottom portion 6 for supporting the cables and two end portions or branches 9a and 9b extending upwardly at an angle from the bottom portion 6. The branches 9a and 9b have upper terminal edges 11a and 11b and the mounting bracket 3 extends from edges 11a and 11b in narrowing tapered fashion towards the rounded free end 12 thereof. In the region of the lower end 12 of the mounting bracket 3 is a hole 150 for a fastener (not shown) to attach the mounting bracket and thereby the holder to the support structure (not shown).

Secured to the mounting bracket 3 in proximity to the edge 17 are two cylindrical pins 20a, 20b which extend perpendicularly to the flat surface 21 of the mounting bracket 3 in a direction away from the cable supporting portion 5. In order to attach the cable holder to the support structure, the cylindrical pins 20a and 20b are engaged with an edge of the support structure and the fastener is secured to the support structure via the hole 150 in the mounting bracket. By virtue of the engagement of the cylindrical pins 20a and 20b on the edge of the support structure, a stable and secure attachment is made for the holder on the support structure due to the bracing of the pins against rotation of the holder around the fastener. The mounting of the cable holder to the vehicle structure is therefore achieved very simply and only involves the attachment of the fastener to the supporting structure.

The supporting structure requires an edge against which the pins can be engaged and if such an edge is not on the structure itself, an opening can be formed by a hole in the supporting structure of circular, elliptical, or prismatic shape. It is only necessary that the hole provide a bearing surface for the pins to prevent rotation of the holder after the fastener has been installed.

The cable supporting portion has a back flange 15 spaced from the mounting bracket 3 to define a recess 22 in which the cable connector can be retained. The width of the recess 22 is between 25 and 30 mm and its depth is between 12 and 18 mm. The openings 7 are preferably rectangular and have a length of between 3 and 10 mm. As a consequence, of this construction a particularly favorable capability for attaching the cables 21 to the holder by means of a conventional cable connectors 22 is achieved.

After the cable holder has been mounted on the support structure the cables 21 are placed on the cable supporting portion resting on the bottom portion 8 and the cables are secured to the cable supporting portion by the conventional cable connector by passage thereof through the openings 7.

The cable holder is made of polyether ether ketone which can be reinforced with 10 to 30 percent by weight of glass fibers preferably 30 percent by weight.

The cylindrical pins 20a and 20b are preferably located on the mounting bracket 3 at a distance from edge 17 by not more than one half the diameter of the cylindrical pin. The pins have a length of between 2 and 4 mm and preferably 3 mm and a diameter of 2 to 5 mm and preferably 2.5 mm.

Although the pins have been disclosed as being cylindrical they can also have a non-cylindrical shape, for example, elliptical or prismatic.

The width of the recess 22 is defined as the distance between the free ends 11a, 11b of branches 9a, 9b and the depth is defined as the distance between a line connecting the free ends of branches 9a, 9b and the point on the bottom portion 6 most distant therefrom in the vertical direction.

Instead of being at right angles to the cable supporting portion the mounting bracket 3 can be at a different angle depending on the particular application.

Although the invention has been described in conjunction with a specific embodiment thereof, numerous modifications and variations can be made without departing from the scope and spirit of the invention as defined in the attached claims.

What is claimed is:

1. A cable holder for attaching cables to a support structure, said cable holder comprising a mounting bracket attachable to the support structure, a cable supporting portion extending at an angle from said mounting bracket at an edge thereof, said cable supporting portion including a bottom portion for supporting the cables, and two end portions extending upwardly from said bottom portion, said end portion having openings through which a cable connector can pass for securing the cables to the holder, and two cylindrical pins on said mounting bracket in proximity to said end portions, said pins facing in a direction away from said cable supporting portion, said mounting bracket having a mounting hole for a fastener at a distance from said pins, said cable holder being secured to the support structure by said fastener while said pins engage a support edge of the support structure to prevent rotation of the cable holder around the fastener.

2. The cable holder of claim 1, wherein said mounting bracket and said cable supporting portion are formed as a one-piece body.

3. The cable holder of claim 2, wherein said one-piece body is made of polyether ether ketone.

4. The cable holder of claim 3, wherein said one-piece body contains 10 to 30% by weight of glass fibers.

5. The cable holder of claim 1, wherein said openings are formed as rectangular slots.

6. The cable holder of claim 5, wherein each said slot is between 3 and 10 mm in length.

7. The cable holder of claim 1, wherein each pin has a length of 3 to 4 mm and a diameter of 2 to 5 mm.

8. The cable holder of claim 1, wherein said cable supporting portion includes a back flange forming a recess for the cable connector.

9. The cable holder of claim 8, wherein said recess has a width of 25 to 30 mm and a depth between 12 and 18 mm.

\* \* \* \* \*